(12) United States Patent
Marcoe et al.

(10) Patent No.: US 11,987,353 B2
(45) Date of Patent: May 21, 2024

(54) THERMOPLASTIC SKIN PANELS, TORQUE BOX AND METHOD

(71) Applicant: The Boeing Company, Chicago, IL (US)

(72) Inventors: Jeffery Lee Marcoe, Bellevue, WA (US); Marc R. Matsen, Seattle, WA (US); Waeil M. Ashmawi, Bellevue, WA (US); Sahrudine Apdalhaliem, Seattle, WA (US)

(73) Assignee: The Boeing Company, Chicago, IL (US)

( * ) Notice: Subject to any disclaimer, the term of this patent is extended or adjusted under 35 U.S.C. 154(b) by 170 days.

(21) Appl. No.: 17/659,671

(22) Filed: Apr. 19, 2022

(65) Prior Publication Data

US 2023/0331370 A1 Oct. 19, 2023

(51) Int. Cl.
*B64C 3/26* (2006.01)
*B29C 35/08* (2006.01)
*B29C 70/68* (2006.01)
*B29K 101/12* (2006.01)
*B29K 105/08* (2006.01)
*B29L 31/30* (2006.01)

(52) U.S. Cl.
CPC ............ *B64C 3/26* (2013.01); *B29C 35/0805* (2013.01); *B29C 70/685* (2013.01); *B29C 2035/0811* (2013.01); *B29K 2101/12* (2013.01); *B29K 2105/0809* (2013.01); *B29L 2031/3085* (2013.01)

(58) Field of Classification Search
CPC ..... B64C 3/26; B29C 35/0805; B29C 70/685; B29C 2035/0811; B29K 2101/12; B29K 2105/0809
See application file for complete search history.

(56) References Cited

U.S. PATENT DOCUMENTS

| | | | | |
|---|---|---|---|---|
| 4,304,376 A | * | 12/1981 | Hilton | ........................ B64C 3/20 428/116 |
| 4,657,615 A | | 4/1987 | Braun et al. | |
| 5,500,511 A | * | 3/1996 | Hansen | ............... B29C 66/3472 156/272.4 |
| 5,710,414 A | | 1/1998 | Matsen et al. | |
| 6,638,466 B1 | | 10/2003 | Abbott | |

(Continued)

FOREIGN PATENT DOCUMENTS

| | | |
|---|---|---|
| EP | 2842867 A1 | 3/2015 |
| WO | 2008124352 A1 | 10/2008 |

OTHER PUBLICATIONS

Matsen et al., "Induction Consolidation/Molding of Thermoplastic Composites Using Smart Susceptors," Final Technical Report, Office of Scientific & Technical Information Report No. 1043163, Jun. 14, 2012, 81 pages.

(Continued)

*Primary Examiner* — Justin M Benedik
(74) *Attorney, Agent, or Firm* — Yee & Associates, P.C.

(57) ABSTRACT

Stiffened skin panels comprise alternating truss core portions and solid laminate portions sandwiched between inner and outer facesheets, all formed from a fiber reinforced thermoplastic. The components of the panels are co-consolidated using induction heating. The panels are stiffened with spars fastened to the solid laminate portions.

20 Claims, 6 Drawing Sheets

(56) References Cited

U.S. PATENT DOCUMENTS

| | | | | |
|---|---|---|---|---|
| 8,973,871 | B2* | 3/2015 | Marcoe | B32B 5/022 |
| | | | | 264/258 |
| 9,358,703 | B2* | 6/2016 | Matsen | B29C 70/446 |
| 9,469,087 | B2* | 10/2016 | Matsen | B29C 33/06 |
| 9,662,742 | B2* | 5/2017 | Matsen | B23K 20/129 |
| 10,358,821 | B2* | 7/2019 | Cawthorne | B29C 66/474 |
| 11,046,420 | B2* | 6/2021 | Walker | B32B 3/266 |
| 2004/0145080 | A1* | 7/2004 | Tanaka | B29C 70/443 |
| | | | | 264/258 |
| 2007/0289700 | A1 | 12/2007 | Nelson | |
| 2008/0245927 | A1 | 10/2008 | Kulesha | |
| 2008/0245928 | A1 | 10/2008 | Kulesha | |
| 2018/0022438 | A1* | 1/2018 | Crespo Peña | B29C 45/0001 |
| | | | | 244/123.1 |
| 2018/0086429 | A1* | 3/2018 | Sheppard | B64C 9/00 |
| 2020/0298500 | A1* | 9/2020 | Koehn | B29C 66/61 |
| 2021/0187796 | A1* | 6/2021 | Marcoe | B64C 1/068 |
| 2021/0187874 | A1* | 6/2021 | Marcoe | B29C 70/549 |
| 2021/0187878 | A1* | 6/2021 | Marcoe | B29C 65/168 |
| 2021/0188461 | A1* | 6/2021 | Marcoe | B29C 70/549 |

OTHER PUBLICATIONS

Matsen, "Energy Efficient Thermoplastic Manufacturing," U.S DOE Advanced Manufacturing Office Program Review Meeting, Washington D.C., Jun. 11-12, 2010, 9 pages.

Marcoe et al., Control Surface and Method of Making the Same, U.S. Appl. No. 17/446,550, filed Aug. 31, 2021, 44 pages.

European Patent Office, Extended Search Report, dated Mar. 10, 2023, regarding Application No. EP22179474.6, 11 pages.

European Patent Office, Partial Search Report, dated Nov. 23, 2022, regarding Application No. EP22179474.6, 13 pages.

Office Action, dated Feb. 1, 2024, regarding U.S. Appl. No. 17/446,550, 35 pages.

* cited by examiner

THERMOPLASTIC SKIN PANELS, TORQUE BOX AND METHOD

BACKGROUND INFORMATION

1. Field

The present disclosure generally relates to composite structures, and deals more particularly with stiffened thermoplastic skin panels, as well as a torque box formed from such panels, and a method of making the panels.

2. Background

Wing skin panels for aircraft commonly comprise either solid skin panels stabilized by multiple spars, integrally stiffened skins and stringer panels supported with spars and multiple ribs, or honeycomb sandwich skins and spars. These components are made from either metallic or thermoset polymers. Although satisfactory for many applications, these designs may have several limitations. For example, components made from a thermoset polymers may have limited fracture toughness and residual strength compared to thermoplastic materials, particularly at elevated temperatures. Moreover, skin panels employing thermosets can be time-consuming to produce because of the time periods needed to cure these materials.

Accordingly, there is a need for a more robust wing skin panel design that is well suited for high volume production and which may possess greater fracture toughness and residual strength, particularly at high temperatures.

SUMMARY

The disclosure relates in general to composite structures, and more specifically to stiffened skin panels and torque boxes used in aircraft.

According to one aspect, a stiffened skin panel assembly is provided comprising a panel including inner and outer facesheets, and a panel core sandwiched between the inner and outer facesheets. The panel core includes alternating sections of truss core portions and solid laminate portions. The skin panel assembly further comprises spars respectively attached to the solid laminate portions. The components of the panel are formed from fiber reinforced thermoplastic.

According to another aspect, a wing torque box is provided comprising first and second skin panel assemblies, and at least two spaced apart spars extending between the first and second skin panel assemblies. Each of the first and second skin panel assemblies includes inner and outer facesheets and a core sandwiched between the inner and outer facesheets. The core includes truss core portions and solid laminate portions forming a spar cap configured to be fastened to one of the spars. The components of the skin panel assemblies are formed from fiber reinforced thermoplastic.

According to still another aspect, a method is provided of making a stiffened skin panel assembly. The method comprises assembling a panel core by arranging alternating sections of thermoplastic truss core portions and thermoplastic laminate portions, and placing the panel core between a thermoplastic inner facesheet and a thermoplastic outer facesheet. The method further comprises co-consolidating the panel core, the thermoplastic inner facesheet and the thermoplastic outer facesheet.

One of the advantages of the disclosed skin panel is that it is light weight, yet exhibits great fracture toughness and residual strength, particularly at high temperatures. Another advantage is that the wing panel is capable of reacting high amounts of bending forces and torque loads. A further advantage is that the skin panel is relatively simple in construction and may reduce the number of spars required for a given application. Another advantage is that the wing panels may be used to form light weight, high strength torque boxes. Still another advantage is that the wing panels can be produced in shorter amounts of time, thus making them well-suited for high volume production. Another advantage is that the components of the skin panel are highly integrated due to the higher consolidation pressures that are used, resulting in improved damage tolerance capability.

The features, functions, and advantages can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and advantages thereof, will best be understood by reference to the following detailed description of an illustrative examples of the present disclosure when read in conjunction with the accompanying drawings, wherein:

DETAILED DESCRIPTION

Figure 1:
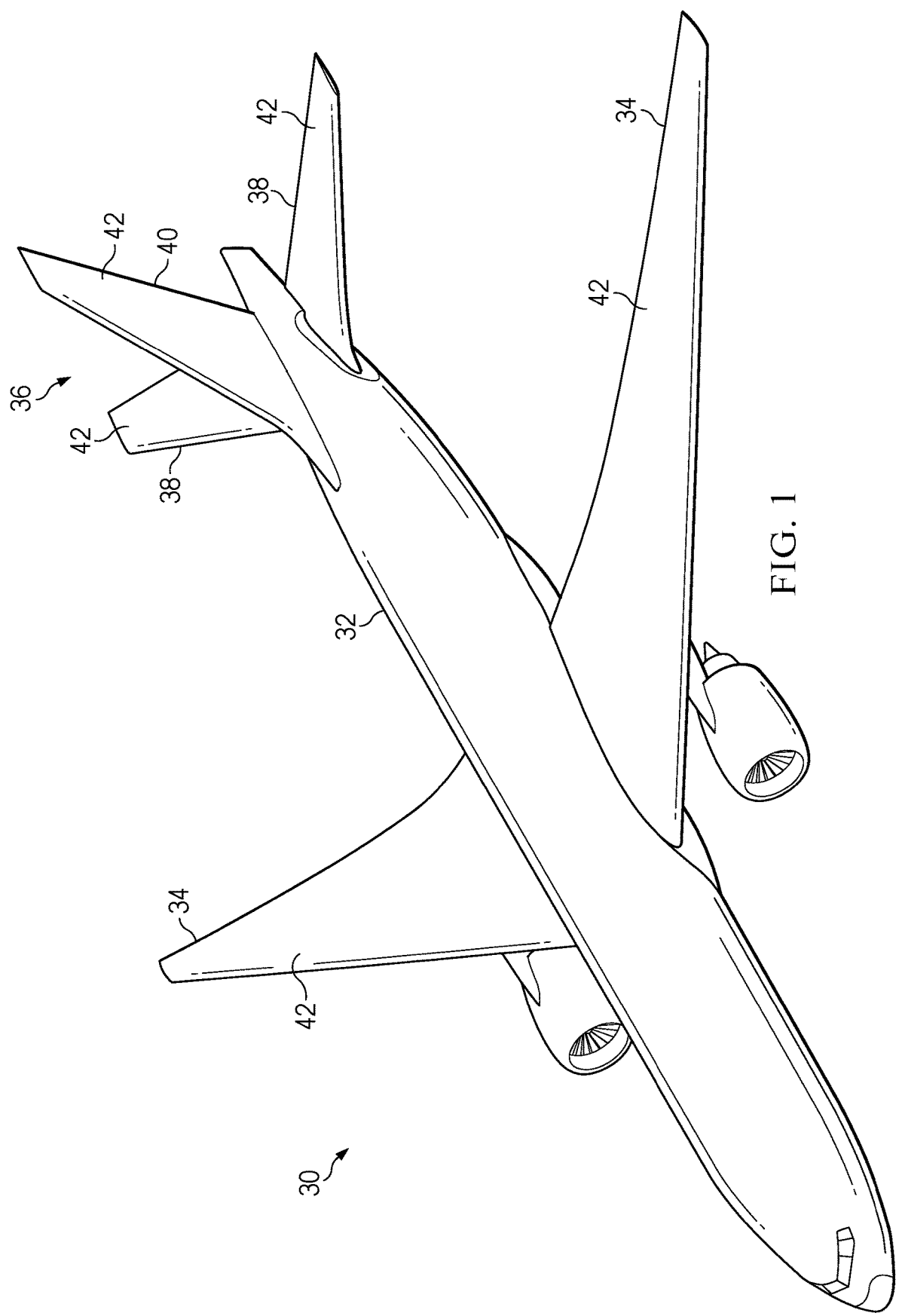
FIG. 1 is an illustration of a perspective view of an airplane.
Figure 2:
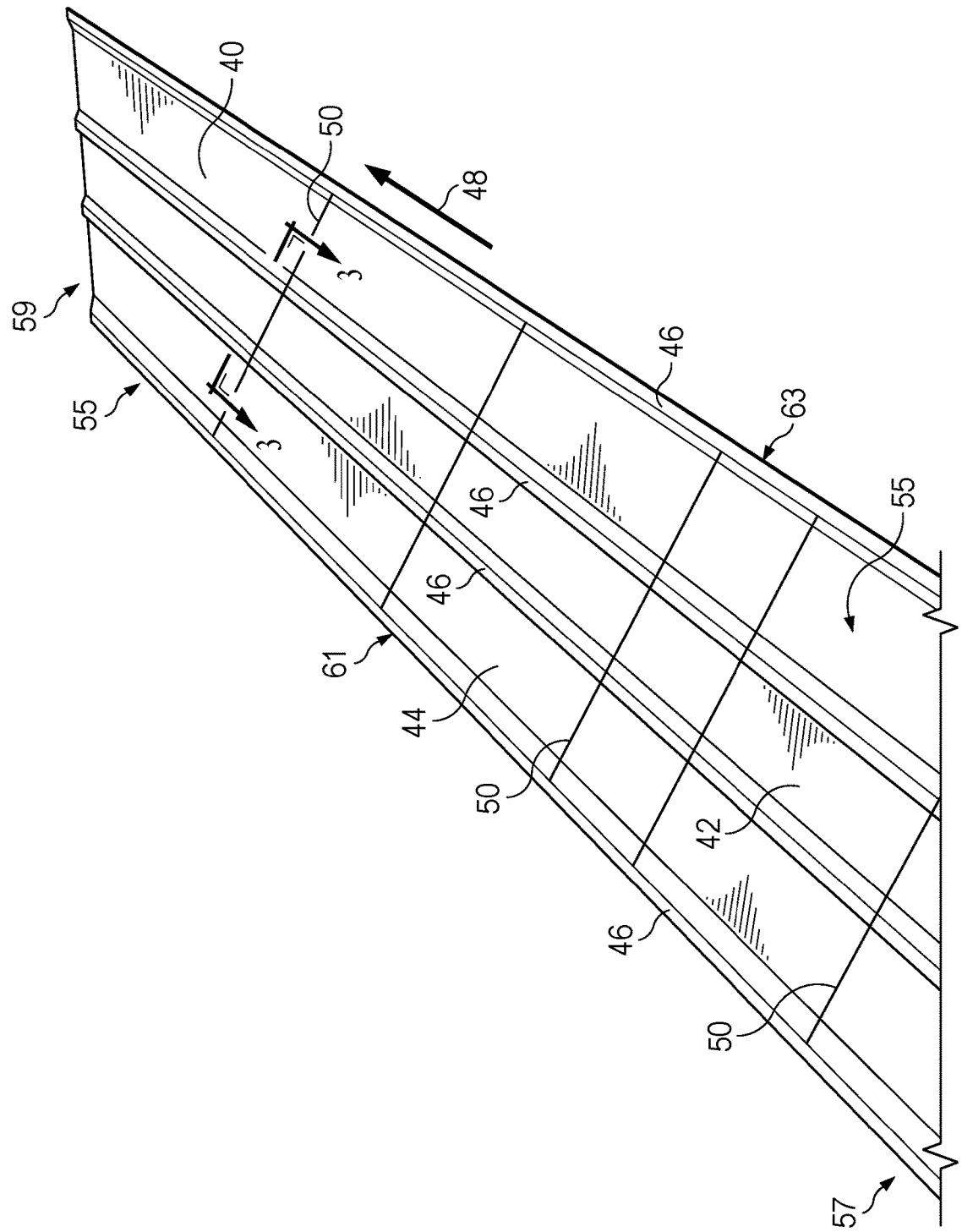
FIG. 2 is an illustration of a fragmentary, side elevational view of the vertical stabilizer forming part of the airplane shown in FIG. 1.

Referring first to FIG. 1, an airplane 30 has a fuselage 32, a pair of wings 34 and an empennage 36, comprising horizontal stabilizers 38 and a vertical stabilizer 40. These components of the airplane 30 are covered by an outer wing skin 42, which may comprise, for example and without limitation, a carbon fiber reinforced thermoplastic laminate. As will be discussed below in more detail, the wings 34 and stabilizers 38, 40 comprise wing skin panels that are stiffened by spars and internal truss cores, and are arranged to form torque boxes that are highly effective in reacting bending and torsional loads, and which have high fracture resistance and residual strength.

Attention is now directed to FIGS. 2-5, which illustrate additional details of stiffened skin panel assemblies 44 that are arranged to form torque boxes 55 within the vertical stabilizer 40. Similar torque boxes 55 employing the stiffened skin panel assemblies 44 may be employed in the horizontal stabilizers 38, as well as in the wings 34 of the airplane 30. In the illustrated example, each of the torque boxes 55 comprises a pair of skin panels 43 that are stiffened by four spars 46 which extend in the lengthwise direction 48 of the vertical stabilizer 40, from root 57 to tip 59. Each of the spars 46 is C-shaped in cross section, and comprises a web 60 and a pair of flanges 62. However, in some applications, the spars 46 may have other cross sectional shapes. Each of the spars 46 comprises a fiber reinforced polymer laminate, such as a carbon fiber reinforced thermoplastic epoxy, however in other examples, the spars 46 may be metallic. Although four spars 46 are employed in the illustrated example, the number of spars used will depend on the application, and may be as few as two or greater than four. Optionally, in order to increase the rigidity of the stiffened skin panel assembly 44 and the torque box 55, ribs 50 extending fore and aft may be installed between and fastened to the spars 46 using shear ties (not shown).

Each of the stiffened skin panel assemblies 44 further comprises a skin panel 43 which includes a panel core 45 sandwiched 64 (FIG. 4) between inner and outer facesheets 54, 56 respectively. Each of the facesheets 54, 56 as well as the panel core 45 comprises a fiber reinforced thermoplastic such as carbon fiber reinforced PEEK (polyether ether ketone) or PEKK (polyetherketoneketone, formed by laying up multiple plies of the material, which may be in the form of tape or a fabric. As will be discussed below in more detail, the above mentioned thermoplastic components of the skin panel 43 are co-consolidated to form a highly integrated, lightweight panel structure having superior residual strength, fracture toughness and damage tolerance, and which is especially well suited for use in high temperature environments.

Figure 3:
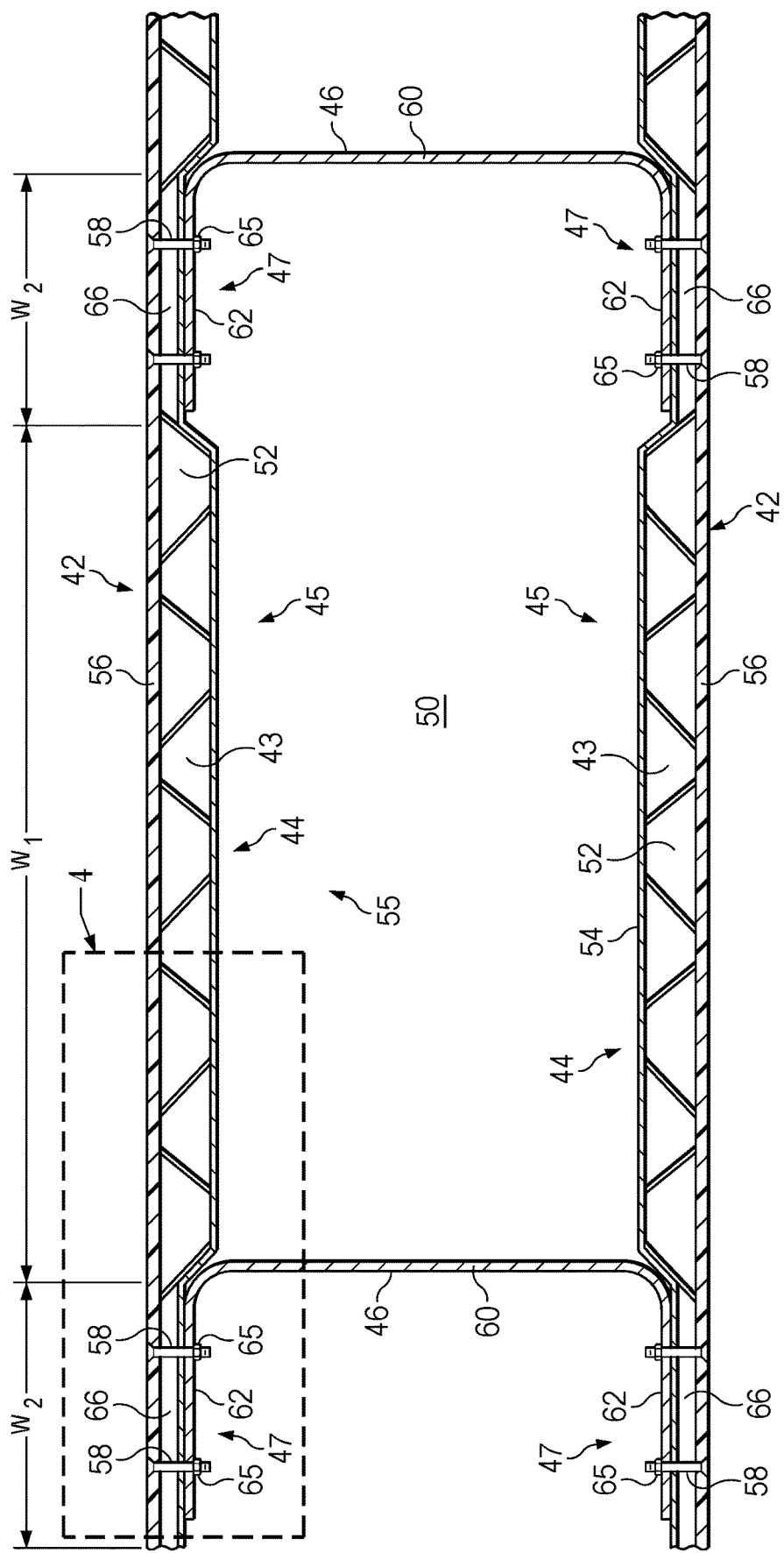
FIG. 3 is an illustration of a sectional view taken along the line 3-3 in FIG. 2.
Figure 4:
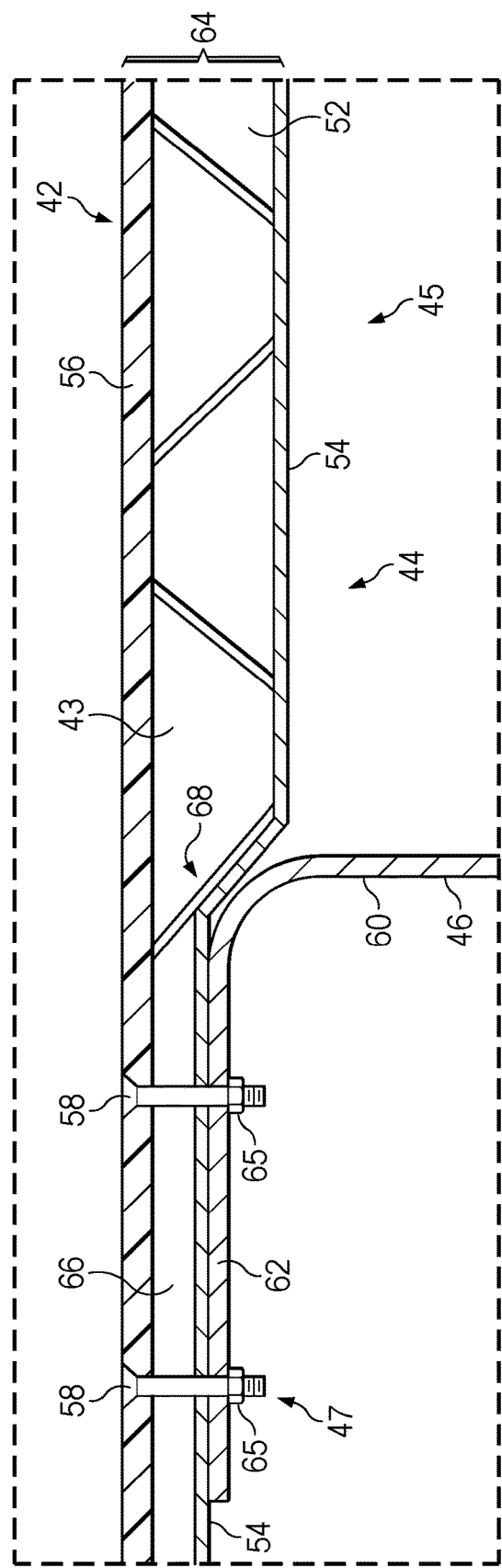
FIG. 4 is an illustration of the area designated as "4" in FIG. 3.
Figure 5:
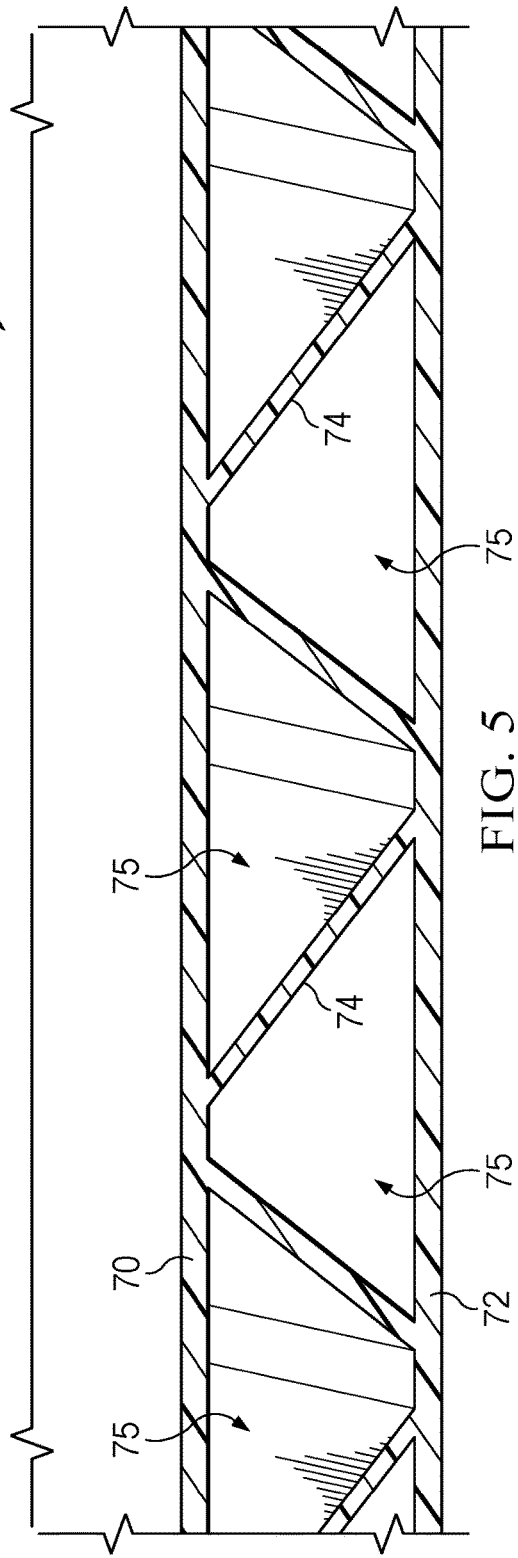
FIG. 5 is an illustration of an isometric, cross sectional view of the truss core forming part of the wing panel.

In the illustrated example, the multi-ply outer facesheet 56 forms the wing skin 42. The panel core 45 extends continuously between and is highly integrated with the inner and outer facesheets 54, 56 due to their co-consolidation. The panel core 45 comprises alternating truss core portions 52 and solid laminate portions 66 that are arranged side-by-side, and contact with each other edge-to-edge. The truss core portions 52 are in face-to-face contact with the outer facesheet 56 across its entire area, and act to stabilize the wing skin 42. Referring to FIG. 3, the width $W_1$ of the truss core portions 52 may be constant or may vary depending on the particular application. The widths $W_2$ of the solid laminate portions 66 are equal to or greater than that of the flanges 62 of the spars 46, but also may vary with the application. Similarly, the thicknesses of the solid laminate portions 66 and the truss core portions 52 will depend on the particular application. Each of the solid laminate portions 66 comprises multiple laminated plies of a suitable fiber reinforced thermoplastic such as those mentioned previously. Both the truss core portions 52 and the solid laminate portions 66 are preconsolidated and then placed in tooling where they are co-consolidated with the inner and outer faceheets 54, 56.

The inner facesheet 54 also comprises multiple laminated piles of a fiber reinforced thermoplastic similar to the outer facesheet 56, and extends continuously, without interruption across the inner face of the panel core 45, including across the interface 68 between the truss core portions 52 and the solid laminate portions 66. The solid laminate portions 66 form highly orthogonal spar caps 47 which are aligned with and attached to the flanges 62 by any suitable fastening system, which may include threaded fasteners 58, nuts 65 and nut plates (not shown). The solid laminate portions 66 act both to stiffen the skin panel 43 and serve as highly rigid anchoring points for the spars 46.

The truss core portions 52 provide the skin panel 43 with improved bending stiffness and torsional resistance. The design of the truss core portions 52 can vary with the application, but in the illustrated example, comprises top and bottom chords 70, 72 respectively joined together by angularly oriented webs 74. The webs 74 extend in the lengthwise direction 48 of the vertical stabilizer 40. The truss core portions 52 are tapered in thickness from root 57 to tip 59 (FIG. 2), and may also be tapered from the leading edge 61 to the trailing edge 63. In some forms of the truss core portions 52, the webs 60 may be arranged substantially perpendicular to the chords 70, 72.

In one example, the chords 70, 72 and the webs 60 are formed of multi-ply carbon fiber reinforced thermoplastic tape, while the inner and outer facesheets 54, 56 are formed of multi-ply carbon fiber reinforced thermoplastic tape or fabric. However, it is possible to form the chords 70, 72, webs 60 and the inner and outer facesheets 54, 56 from other forms of fiber reinforced thermoplastic materials. The elements of the truss core portions 52 including the top and bottom chords 70, 72 along with the webs 74 can be laid up using automatic tape laying (ATL) machines or automatic fiber placement (AFP) machines, depending upon whether fiber reinforced tape or tows are used. Following layup, mandrels (not shown) are inserted longitudinally in the internal spaces 75 between the webs 74, following which the truss core portion layup is placed in solid tooling (not shown) and heated to consolidation temperature using induction heating employing smart susceptors. Consolidation pressure applied through the heated tooling results in co-consolidation of the top chord 70, bottom chord 72 and webs 74 into a strong, thin, lightweight consolidated structure.

Figure 6:
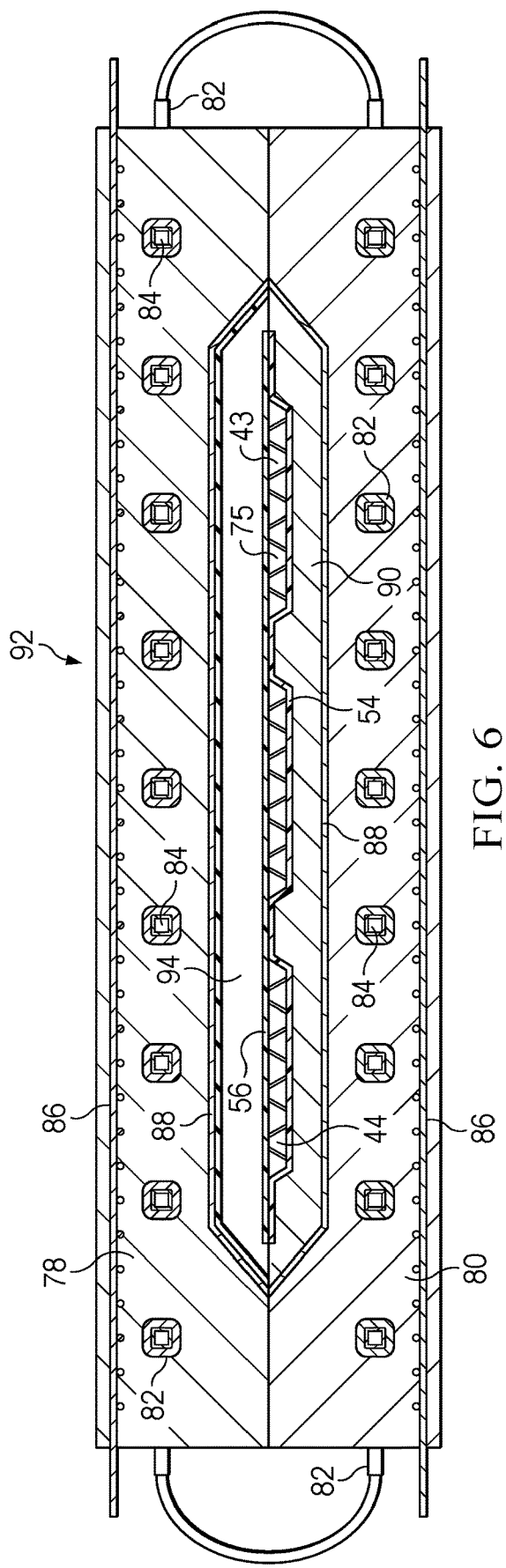
FIG. 6 is an illustration of a cross-sectional view of apparatus for induction consolidation of the wing panel.

Attention is now directed to FIG. 6, which illustrates an induction consolidation assembly 92 that can be used to consolidate the components of the skin panel 43 into a substantially lightweight, highly integrated structure. Broadly, the induction consolidation assembly 92 comprises upper and lower dies 78, 80, respectively, die inserts 90, and an inflatable bladder 94. The upper and lower dies 78, 80 are formed of a nonconductive material such as ceramic, and the inflatable bladder 94 is formed of aluminum or magnesium while the die insert 90 is typically formed of a low thermal expansion alloy (typically Invar 42) to match the overall Coefficient of Thermal Expansion (CTE) of the composite component. The die insert 90 has a shape that complements that of the bottom of the skin panel 43. The upper and lower dies 78, 80 are lined with smart susceptors 88. In one example, the smart susceptors 88 are formed of ferromagnetic materials such as alloys of iron (Fe), nickel (Ni) and/or cobalt (Co), plus additional non-magnetic alloying metal elements that improve alloy fabrication processes such as initial ingot manufacturing and subsequent rolling and drawing. The material from which the smart susceptors 88 are formed is chosen to have a Curie temperature close to but slightly higher than the consolidation temperature of the thermoplastic components of the skin panel 43. The heat produced by the smart susceptors 88 decreases as the temperature increases to the Curie temperature, thereby preventing overheating of the skin panel 43 while ensuring adequate melting to allow full consolidation of the skin panel components.

Each of the upper and lower dies 78, 80 includes suitable reinforcement rods 86, and are each provided with an internal electrical induction coil 82 that is coupled with a suitable source of AC power. Each of the upper and lower dies 78, 80 includes a means of cooling which, in the illustrated example, comprise coolant passageways 84 that are internal to the induction coil 82.

Figure 7:
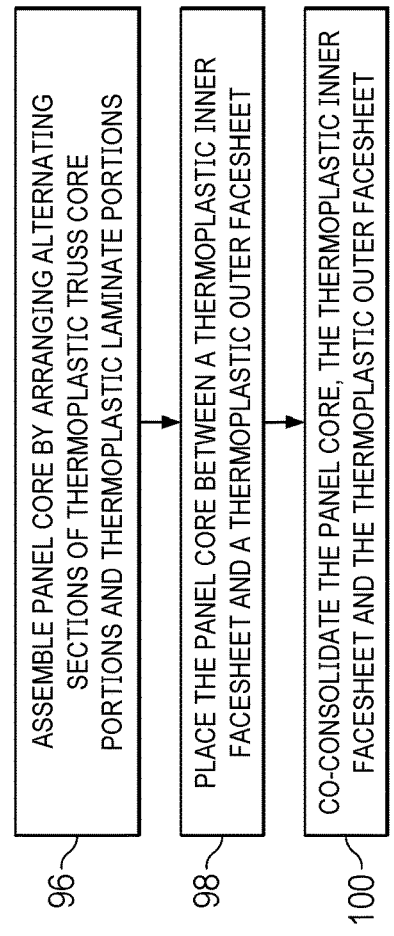
FIG. 7 is an illustration of a flow diagram of a method for making a stiffened skin panel assembly.

FIG. 7 broadly illustrates a method for making a stiffened skin panel assembly. At 96, a panel core 45 is assembled by arranging alternating sections of thermoplastic truss core portions 52 and thermoplastic laminate portions 66. At 98, the panel core 45 is placed between a thermoplastic inner facesheet 54 and a thermoplastic outer facesheet 56. At 100, the panel core 45, the thermoplastic inner facesheet 54 and the thermoplastic outer facesheet 56 are co-consolidated.

In use, with the upper and lower dies 78, 80 open (separated), the skin panel 43 is placed in the die insert 90. In one example, automated equipment (not shown) such as pneumatic actuators is used to insert the mandrels (not shown) within the internal spaces 75 in the truss core portions 52 either before or after the skin panel 43 is placed in the die insert 90. However, in other examples the mandrels can be manually inserted. Furthermore, the placement of the mandrels can be part of the build-up (lay-up) of the skin panel 43 where every other mandrel is placed on the lower skin lay-up and then one or more fabric layers are placed over these mandrels. Then the remaining mandrels are set between the current mandrels thereby capturing the truss core material between the mandrel sets. Then the upper skin is set in place. With the skin panel 43 in the die insert 90, the dies 78, 80 are closed, thereby sandwiching the skin panel 43 layup between the die insert 90 and the inflatable bladder 94. The induction coil 82 is then energized to produce a magnetic field that induces the flow of eddy currents in the smart susceptor 88. These eddy currents result in the generation of heat which melts the thermoplastic components of the skin panel 43 layup. As these thermoplastic components begin to soften and melt, the inflatable bladder 94 is inflated to apply consolidation pressure to the skin panel 43 layup until the consolidation temperature of the thermoplastic is reached. The Curie temperature of the materials from which the smart susceptor 118 are formed is selected to substantially equal or slightly exceed the desired consolidation temperature. Consequently, the consolidation temperature of the thermoplastic is not substantially exceeded because the smart susceptors 88 do not heat beyond their Curie temperature. Following heating of the skin panel 43 layup to its consolidation temperature, the upper and lower dies 78, 80 are cooled, allowing the skin panel 43 to cool, following which the inflatable bladder 94 is deflated and the dies 78, 80 are separated to allow removal of the fully consolidated skin panel 43. The final step consists of extracting the truss core mandrels. FIG. 7 broadly illustrates a method for making a stiffened skin panel assembly. At 96, a panel core 45 is assembled by arranging alternating sections of thermoplastic truss core portions 52 and thermoplastic laminate portions 66. At 98, the panel core 45 is placed between a thermoplastic inner facesheet 54 and a thermoplastic outer facesheet 56. At 100, the panel core 45, the thermoplastic inner facesheet 54 and the thermoplastic outer facesheet 56 are co-consolidated.

Figure 8:
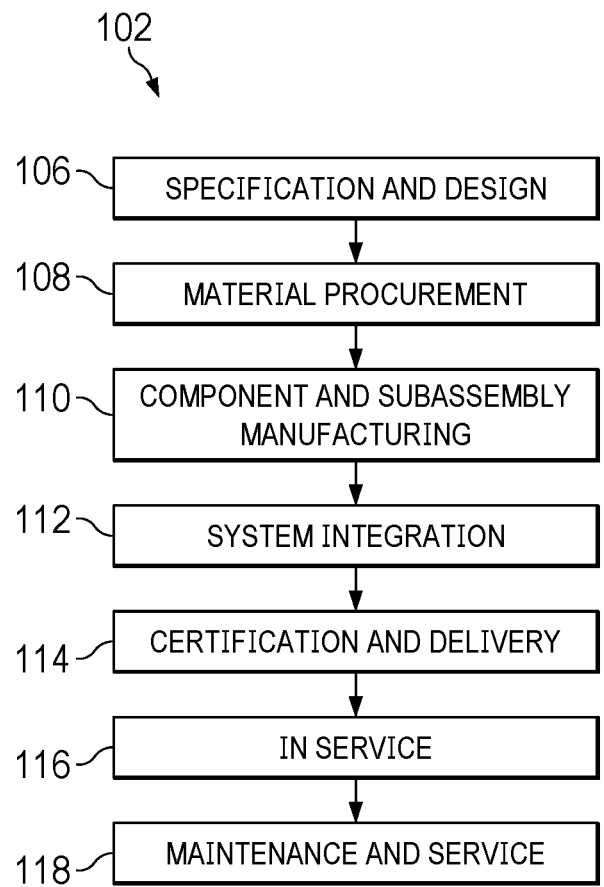
FIG. 8 is an illustration of a flow diagram of aircraft production and service methodology.
Figure 9:
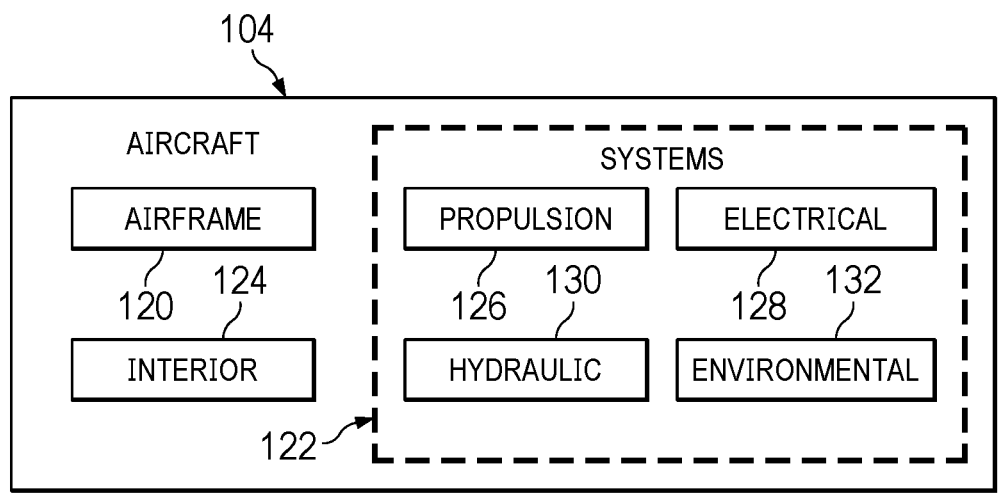
FIG. 9 is an illustration of a block diagram of an aircraft.

Examples of the disclosure may find use in a variety of potential applications, particularly in the transportation industry, including for example, aerospace, marine, automotive applications and other application where skin panels and torque boxes, may be used. Thus, referring now to FIGS. 8 and 9, examples of the disclosure may be used in the context of an aircraft manufacturing and service method 102 as shown in FIG. 8 and an aircraft 104 as shown in FIG. 9. Aircraft applications of the disclosed examples may include a variety of wing skins and torque box structures. During pre-production, exemplary method 102 may include specification and design 106 of the aircraft 104 and material procurement 108. During production, component and subassembly manufacturing 110 and system integration 112 of the aircraft 104 takes place. Thereafter, the aircraft 104 may go through certification and delivery 114 in order to be placed in service 116. While in service by a customer, the aircraft 104 is scheduled for routine maintenance and service 118, which may also include modification, reconfiguration, refurbishment, and so on.

Each of the processes of method 102 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 9, the aircraft 104 produced by exemplary method 102 may include an airframe 120 with a plurality of systems 122 and an interior 124. The airframe 120 includes wing skin panels as well as torque boxes. Examples of high-level systems 122 include one or more of a propulsion system 126, an electrical system 128, a hydraulic system 140 and an environmental system 132. Any number of other systems may be included. Although an aerospace example is shown, the principles of the disclosure may be applied to other industries, such as the marine and automotive industries.

Systems and methods embodied herein may be employed during any one or more of the stages of the aircraft manufacturing and service method 102. For example, components or subassemblies corresponding to production process 110 may be fabricated or manufactured in a manner similar to components or subassemblies produced while the aircraft 104 is in service. Also, one or more apparatus examples, method examples, or a combination thereof may be utilized during the production processes 110 and 112, for example, by substantially expediting assembly of or reducing the cost of an aircraft 104. Similarly, one or more of apparatus examples, method examples, or a combination thereof may be utilized while the aircraft 104 is in service, for example and without limitation, to maintenance and service 118.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different advantages as compared to other illustrative examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A stiffened skin panel assembly, comprising:
a panel including inner and outer facesheets, and a panel core sandwiched between the inner and outer facesheets, the panel core including alternating sections of truss core portions and solid laminate portions arranged side-by-side and contact with each other edge-to-edge, wherein the truss core portions are tapered in thickness along the edge-to-edge contact; and
spars respectively attached to the solid laminate portions.

2. The stiffened skin panel assembly of claim 1, wherein:
the spars include flanges;
the solid laminate portions form spar caps aligned with the flanges; and
the stiffened skin panel assembly further includes fasteners extending through the flanges and the spar caps.

3. The stiffened skin panel assembly of claim 1, wherein each of the solid laminate portions is a fiber reinforced thermoplastic.

4. The stiffened skin panel assembly of claim 1, wherein each of the truss core portions is a fiber reinforced thermoplastic.

5. The stiffened skin panel assembly of claim 1, wherein each of the truss core portions includes a top chord, a bottom chord and a plurality of webs connecting the top chord with the bottom chord.

6. The stiffened skin panel assembly of claim 5, wherein the webs extend parallel to the spars.

7. The stiffened skin panel assembly of claim 1, wherein the outer facesheet is a fiber reinforced thermoplastic forming an outer skin of the panel.

8. The stiffened skin panel assembly of claim 1, wherein the inner and outer facesheets and the panel core are a consolidated thermoplastic.

9. The stiffened skin panel assembly of claim 1, wherein each of the inner facesheet and the outer facesheet extends continuously across the alternating sections of the truss core portions and solid laminate portions.

10. A wing torque box, comprising:
first and second skin panel assemblies; and
at least two spaced apart spars extending between the first and second skin panel assemblies,
each of the first and second skin panel assemblies including respective inner and outer facesheets and a respective core sandwiched between the respective inner and outer facesheets,
each respective core including truss core portions and solid laminate portions, wherein each of the solid laminate portions forms a spar cap configured to be fastened to one of the spars.

11. The wing torque box of claim 10, wherein each of the inner facesheet, the outer facesheet, and the core is a fiber reinforced thermoplastic.

12. The wing torque box of claim 10, wherein each inner facesheet extends continuously over respective solid laminate portions and respective truss core portions.

13. The wing torque box of claim 12, wherein each inner facesheet is disposed between the spars and respective solid laminate portions.

14. The wing torque box of claim 10, wherein each of the truss core portions is a fiber reinforced thermoplastic and includes a top chord, a bottom chord and a plurality of webs connected between the top chord and the bottom chord.

15. The wing torque box of claim 14, wherein:
each outer facesheet is a laminate forming an outer skin and overlies the top chord of respective truss core portions, and
the respective inner facesheet extends over the bottom chord of the respective truss core portions.

16. A method of making a stiffened skin panel assembly, comprising:
assembling a panel core by arranging alternating sections of thermoplastic truss core portions and thermoplastic laminate portions arranged side-by-side and contact with each other edge-to-edge, wherein the truss core portions are tapered in thickness along the edge-to-edge contact;
placing the panel core between a thermoplastic inner facesheet and a thermoplastic outer facesheet; and
co-consolidating the panel core, the thermoplastic inner facesheet and the thermoplastic outer facesheet.

17. The method of claim 16, further comprising:
laying up each of the thermoplastic truss core portions; and
pre-consolidating the thermoplastic truss core portions before assembling the panel core.

18. The method of claim 16, wherein arranging the alternating sections includes placing the thermoplastic truss core portions in face-to-face contact with the thermoplastic outer facesheet across an entire area of the thermoplastic truss core portions.

19. The method of claim 16, wherein the co-consolidating includes:
placing the panel core, the thermoplastic inner facesheet, and the thermoplastic outer facesheet in a set of dies, and
heating the dies to a consolidation temperature using smart susceptors.

20. The method of claim 16, further comprising:
fastening a spar to each of the thermoplastic laminate portions.

* * * * *